United States Patent
Mejdrich et al.

(10) Patent No.: US 8,248,422 B2
(45) Date of Patent: Aug. 21, 2012

(54) EFFICIENT TEXTURE PROCESSING OF PIXEL GROUPS WITH SIMD EXECUTION UNIT

(75) Inventors: Eric Oliver Mejdrich, Rochester, MN (US); Paul Emery Schardt, Rochester, MN (US); Robert Allen Shearer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1252 days.

(21) Appl. No.: 12/016,306

(22) Filed: Jan. 18, 2008

(65) Prior Publication Data

US 2009/0187734 A1    Jul. 23, 2009

(51) Int. Cl.
G06F 15/80    (2006.01)
G09G 5/37    (2006.01)
G09G 5/00    (2006.01)

(52) U.S. Cl. .................. 345/505; 345/561; 345/582

(58) Field of Classification Search ............. 345/501, 345/505, 522, 536, 561, 582, 589
See application file for complete search history.

(56) References Cited

U.S. PATENT DOCUMENTS

| | | | | |
|---|---|---|---|---|
| 4,432,009 A * | 2/1984 | Reitmeier et al. | ............ | 348/580 |
| 6,198,488 B1 * | 3/2001 | Lindholm et al. | ............ | 345/426 |
| 7,298,375 B1 * | 11/2007 | Hutchins | ............ | 345/561 |
| 7,567,252 B2 * | 7/2009 | Buck et al. | ............ | 345/501 |
| 7,577,869 B2 * | 8/2009 | Mantor et al. | ............ | 714/11 |
| 2002/0062436 A1 * | 5/2002 | Van Hook et al. | ............ | 712/210 |
| 2007/0273698 A1 * | 11/2007 | Du et al. | ............ | 345/501 |
| 2009/0083524 A1 * | 3/2009 | Van Wel | ............ | 712/221 |

* cited by examiner

*Primary Examiner* — Joni Hsu
(74) *Attorney, Agent, or Firm* — Wood, Herron & Evans, LLP (57) ABSTRACT

A circuit arrangement and method perform concurrent texture processing of groups of pixels with a single instruction multiple data (SIMD) execution unit to improve the utilization of the SIMD execution unit when performing scalar operations associated with a texture processing algorithm. In addition, when utilized in connection with a multi-threaded SIMD execution unit, groups of pixels may be concurrently processed in different threads executed by the SIMD execution unit to further maximize the utilization of the SIMD execution unit by reducing the adverse effects of dependencies in scalar and/or vector operations incorporated into a texture processing algorithm.

19 Claims, 6 Drawing Sheets

EFFICIENT TEXTURE PROCESSING OF PIXEL GROUPS WITH SIMD EXECUTION UNIT

FIELD OF THE INVENTION

The invention is generally related to data processing, and in particular to processor architectures and execution units incorporated therein.

BACKGROUND OF THE INVENTION

As semiconductor technology continues to inch closer to practical limitations in terms of increases in clock speed, architects are increasingly focusing on parallelism in processor architectures to obtain performance improvements. At the chip level, multiple processor cores are often disposed on the same chip, functioning in much the same manner as separate processor chips, or to some extent, as completely separate computers. In addition, even within cores, parallelism is employed through the use of multiple execution units that are specialized to handle certain types of operations. Pipelining is also employed in many instances so that certain operations that may take multiple clock cycles to perform are broken up into stages, enabling other operations to be started prior to completion of earlier operations. Multithreading is also employed to enable multiple instruction streams to be processed in parallel, enabling more overall work to be performed in any given clock cycle.

One area where parallelism continues to be exploited is in the area of execution units, e.g., fixed point or floating point execution units. Many floating point execution units, for example, are deeply pipelined. However, while pipelining can improve performance, pipelining is most efficient when the instructions processed by a pipeline are not dependent on one another, e.g., where a later instruction does not use the result of an earlier instruction. Whenever an instruction operates on the result of another instruction, typically the later instruction cannot enter the pipeline until the earlier instruction has exited the pipeline and calculated its result. The later instruction is said to be dependent on the earlier instruction, and phenomenon of stalling the later instruction waiting for the result of an earlier instruction is said to introduce "bubbles," or cycles where no productive operations are being performed, into the pipeline.

One technique that may be used to extract higher utilization from a pipelined execution unit and remove unused bubbles is to introduce multi-threading. In this way, other threads are able to issue instructions into the unused slots in the pipeline, which drives the utilization and hence the aggregate throughput up. Another popular technique for increasing performance is to use a single instruction multiple data (SIMD) architecture, which is also referred to as 'vectorizing' the data. In this manner, operations are performed on multiple data elements at the same time, and in response to the same SIMD instruction. A SIMD or vector execution unit typically includes multiple processing lanes that handle different datapoints in a vector and perform similar operations on all of the datapoints at the same time. For example, for an architecture that relies on quad(4)word vectors, an SIMD or vector execution unit may include four processing lanes that perform the identical operations on the four words in each vector.

The aforementioned techniques may also be combined, resulting in a multi-threaded vector execution unit architecture that enables multiple threads to issue SIMD instructions to an SIMD execution unit to process "vectors" of data points at the same time. Typically, a scheduling algorithm is utilized in connection with issue logic to ensure that each thread is able to proceed at a reasonable rate, with the number of bubbles in the execution unit pipeline kept at a minimum.

It has been found, however, that while this configuration is highly desirable for a significant amount of code, there are certain algorithms that are inefficient when executed entirely in an SIMD execution unit, particularly when such algorithms rely on scalar mathematical operations. A conventional SIMD execution unit may be used to perform scalar math; however, only one out of the multiple processing lanes is used, which creates suboptimal performance, and significant underutilization of processing resources.

One such algorithm that incorporates scalar mathematical operations that can result in underutilization of an SIMD execution unit is rasterization, and in particular texture processing performed in a rasterization process. Rasterization is a process in 3D graphics where three dimensional geometry that has been projected onto a screen is "filled in" with pixels of the appropriate color and intensity. A texture mapping algorithm is typically incorporated into a rasterization process to paint a texture onto geometric objects placed into a scene.

In order to paint a texture onto a placed object in a scene, the pixels in each primitive making up the object are typically transformed from 3D scene or world coordinates (e.g., x, y and z) to 2D coordinates relative to a procedural or bitmapped texture (e.g., u and v). The fundamental elements in a texture are referred to as texels (or texture pixels), and being the fundamental element of a texture, each texel is associated with a single color. Due to differences in orientation and distance of the surfaces of placed geometric primitives relative to the viewer, a pixel in an image buffer will rarely correspond to a single texel in a texture. As a result, texture filtering is typically performed to determine a color to be assigned to a pixel based upon the colors of multiple texels in proximity to the texture mapped position of the pixel.

A number of texture filtering algorithms may be used to determine a color for a pixel, including simple interpolation, bilinear filtering, trilinear filtering, and anisotropic filtering, among others. With many texture filtering algorithms, weights are calculated for a number of adjacent texels to a pixel, the weights are used to scale the colors of the adjacent texels, and a color for the pixel is assigned by summing the scaled colors of the adjacent texels. The color is then either stored at the pixel location in a frame buffer, or used to update a color that is already stored at the pixel location.

Colors, which are often represented by multiple data points, e.g., red (R), green (G), blue (B) and alpha (A, representing transparency), are well suited for being represented as vectors and processed in an SIMD execution unit. On the other hand, other operations in a texture mapping algorithm, most notably the calculation of the weights used to determine the color contributions of adjacent texels in a texture to the final color for a pixel, are predominantly scalar operations, and not particularly well suited for calculation in an SIMD execution unit, given that such calculations may leave all but one processing lane of an SIMD execution unit empty. Furthermore, such operations often include dependencies that result in bubbles in the execution pipeline of an SIMD execution unit.

Consequently, certain operations performed in texture processing are not performed efficiently in conventional SIMD execution units. In addition, due to the relatively high computational cost of texture processing, many image processing systems rely on dedicated hardware accelerators in graphics processing units to perform texture processing, foregoing CPU based texture processing due to comparatively inadequate performance.

Therefore, a need exists in the art for a manner of improving texture processing in an SIMD execution unit.

SUMMARY OF THE INVENTION

The invention addresses these and other problems associated with the prior art by performing concurrent texture processing of groups of pixels with a single instruction multiple data (SIMD) execution unit to improve the utilization of the SIMD execution unit when performing scalar operations associated with a texture processing algorithm. In addition, when utilized in connection with a multi-threaded SIMD execution unit, groups of pixels may be concurrently processed in different threads executed by the SIMD execution unit to further maximize the utilization of the SIMD execution unit by reducing the adverse effects of dependencies in scalar and/or vector operations incorporated into a texture processing algorithm.

Consistent with one aspect of the invention, a processing unit includes a single instruction multiple data (SIMD) execution unit, where the SIMD execution unit includes a plurality of processing lanes and a vector register file. Program code is configured to be executed by the processing unit to apply at least one texture to a plurality of pixels in a graphic image by processing pixels in groups. The program code is configured to load data associated with each pixel in a group of pixels into a common vector register from the vector register file, concurrently perform at least one scalar operation for each pixel in the group of pixels by operating on the common vector register with the SIMD execution unit such that the data associated with each pixel in the group of pixels is processed in a separate processing lane in the SIMD execution unit, and perform at least one vector operation for each pixel in the group of pixels using the SIMD execution unit.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Embodiments consistent with the invention utilize a grouped pixel texture processing algorithm to improve the utilization of an SIMD execution unit when performing texture processing in an image processing data processing system. As such, operations such as scalar operations performed during texel coordinate setup and filtering weight calculations may be grouped together and processed concurrently to better utilize the processing lanes in an SIMD execution unit, while operations such as applying filters to pixels can be performed using vector operations, reducing the overall processing time required to apply a texture to a plurality of pixels, and thus improving overall throughput.

Hardware and Software Environment

Figure 1:
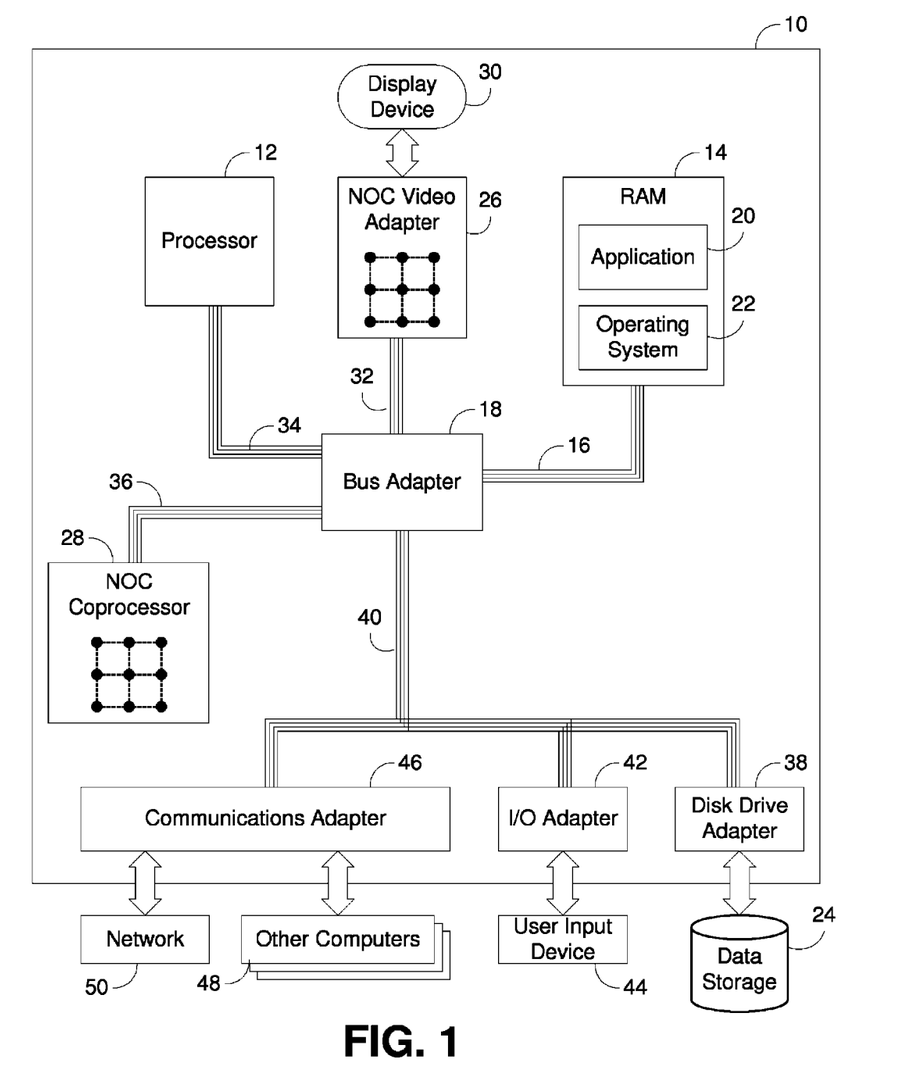
FIG. 1 is a block diagram of exemplary automated computing machinery including an exemplary computer useful in data processing consistent with embodiments of the present invention.

Now turning to the drawings, wherein like numbers denote like parts throughout the several views, FIG. 1 illustrates exemplary automated computing machinery including an exemplary computer 10 useful in data processing consistent with embodiments of the present invention. Computer 10 of FIG. 1 includes at least one computer processor 12 or 'CPU' as well as random access memory 14 ('RAM'), which is connected through a high speed memory bus 16 and bus adapter 18 to processor 12 and to other components of the computer 10.

Stored in RAM 14 is an application program 20, a module of user-level computer program instructions for carrying out particular data processing tasks such as, for example, word processing, spreadsheets, database operations, video gaming, stock market simulations, atomic quantum process simulations, or other user-level applications. Also stored in RAM 14 is an operating system 22. Operating systems useful in connection with embodiments of the invention include UNIX™, Linux™, Microsoft Windows XP™, AIX™, IBM's i5/OS™, and others as will occur to those of skill in the art. Operating system 22 and application 20 in the example of FIG. 1 are shown in RAM 14, but many components of such software typically are stored in non-volatile memory also, e.g., on a disk drive 24.

As will become more apparent below, embodiments consistent with the invention may be implemented within Network On Chip (NOC) integrated circuit devices, or chips, and as such, computer 10 is illustrated including two exemplary NOCs: a video adapter 26 and a coprocessor 28. NOC video adapter 26, which may alternatively be referred to as a graphics adapter, is an example of an I/O adapter specially designed for graphic output to a display device 30 such as a display screen or computer monitor. NOC video adapter 26 is connected to processor 12 through a high speed video bus 32, bus adapter 18, and the front side bus 34, which is also a high speed bus. NOC Coprocessor 28 is connected to processor 12 through bus adapter 18, and front side buses 34 and 36, which is also a high speed bus. The NOC coprocessor of FIG. 1 may be optimized, for example, to accelerate particular data processing tasks at the behest of the main processor 12.

The exemplary NOC video adapter 26 and NOC coprocessor 28 of FIG. 1 each include a NOC, including integrated processor ('IP') blocks, routers, memory communications controllers, and network interface controllers, the details of which will be discussed in greater detail below in connection with FIGS. 2-3. The NOC video adapter and NOC coprocessor are each optimized for programs that use parallel processing and also require fast random access to shared memory. It will be appreciated by one of ordinary skill in the art having the benefit of the instant disclosure, however, that the invention may be implemented in devices and device architectures other than NOC devices and device architectures. The invention is therefore not limited to implementation within an NOC device.

Computer 10 of FIG. 1 includes disk drive adapter 38 coupled through an expansion bus 40 and bus adapter 18 to processor 12 and other components of the computer 10. Disk drive adapter 38 connects non-volatile data storage to the computer 10 in the form of disk drive 24, and may be implemented, for example, using Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

Computer 10 also includes one or more input/output ('I/O') adapters 42, which implement user-oriented input/output through, for example, software drivers and computer hardware for controlling output to display devices such as computer display screens, as well as user input from user input devices 44 such as keyboards and mice. In addition, computer 10 includes a communications adapter 46 for data communications with other computers 48 and for data communications with a data communications network 50. Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters suitable for use in computer 10 include modems for wired dial-up communications, Ethernet (IEEE 802.3) adapters for wired data communications network communications, and 802.11 adapters for wireless data communications network communications.

Figure 2:
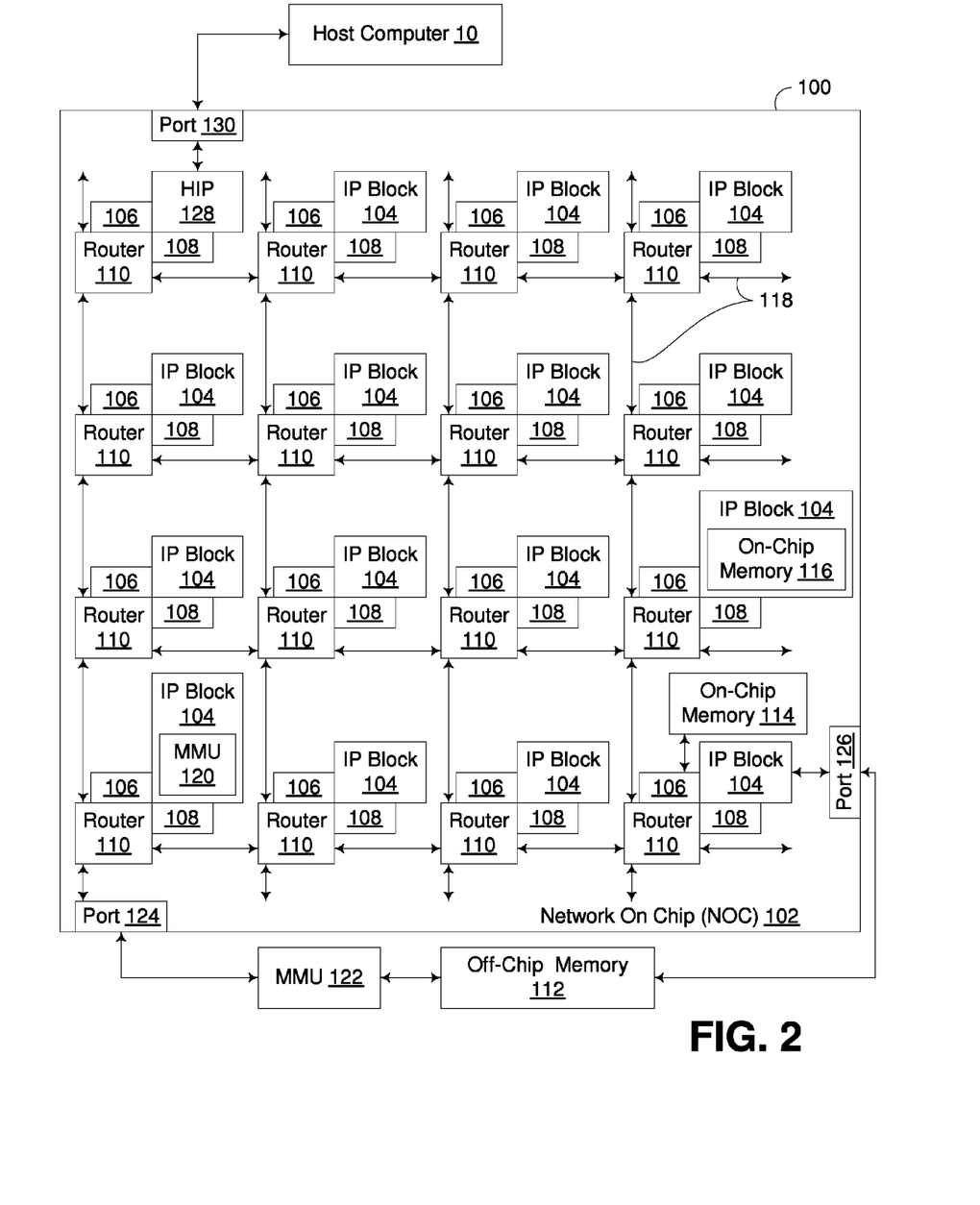
FIG. 2 is a block diagram of an exemplary NOC implemented in the computer of FIG. 1.

For further explanation, FIG. 2 sets forth a functional block diagram of an example NOC 102 according to embodiments of the present invention. The NOC in FIG. 2 is implemented on a 'chip' 100, that is, on an integrated circuit. NOC 102 includes integrated processor ('IP') blocks 104, routers 110, memory communications controllers 106, and network interface controllers 108 grouped into interconnected nodes. Each IP block 104 is adapted to a router 110 through a memory communications controller 106 and a network interface controller 108. Each memory communications controller controls communications between an IP block and memory, and each network interface controller 108 controls inter-IP block communications through routers 110.

In NOC 102, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs consistent with embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well. It will also be appreciated that IP blocks, as well as other logic circuitry implemented consistent with the invention may be distributed in the form of computer data files, e.g., logic definition program code, that define at various levels of detail the functionality and/or layout of the circuit arrangements implementing such logic. Thus, while the invention has and hereinafter will be described in the context of circuit arrangements implemented in fully functioning integrated circuit devices and data processing systems utilizing such devices, those of ordinary skill in the art having the benefit of the instant disclosure will appreciate that circuit arrangements consistent with the invention are capable of being distributed as program products in a variety of forms, and that the invention applies equally regardless of the particular type of computer readable or signal bearing media being used to actually carry out the distribution. Examples of computer readable or signal bearing media include, but are not limited to, physical, recordable type media such as volatile and non-volatile memory devices, floppy disks, hard disk drives, CD-ROMs, and DVDs (among others), and transmission type media such as digital and analog communication links.

Each IP block 104 in the example of FIG. 2 is adapted to a router 110 through a memory communications controller 106. Each memory communication controller is an aggregation of synchronous and asynchronous logic circuitry adapted to provide data communications between an IP block and memory. Examples of such communications between IP blocks and memory include memory load instructions and memory store instructions. The memory communications controllers 106 are described in more detail below with reference to FIG. 3. Each IP block 104 is also adapted to a router 110 through a network interface controller 108, which controls communications through routers 110 between IP blocks 104. Examples of communications between IP blocks include messages carrying data and instructions for processing the data among IP blocks in parallel applications and in pipelined applications. The network interface controllers 108 are also described in more detail below with reference to FIG. 3.

Routers 110, and the corresponding links 118 therebetween, implement the network operations of the NOC. The links 118 may be packet structures implemented on physical, parallel wire buses connecting all the routers. That is, each link may be implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wide, 512 wires. In addition, each link may be bi-directional, so that if the link packet structure includes 64 bytes, the wire bus actually contains 1024 wires between each router and each of its neighbors in the network. In such an implementation, a message could include more than one packet, but each packet would fit precisely onto the width of the wire bus. In the alternative, a link may be implemented on a wire bus that is only wide enough to accommodate a portion of a packet, such that a packet would be broken up into multiple beats, e.g., so that if a link is implemented as 16 bytes in width, or 128 wires, a 64 byte packet could be broken into four beats. It will be appreciated that different implementations may used different bus widths based on practical physical limits as well as desired performance characteristics. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller 106 controls communications between an IP block and memory. Memory can include off-chip main RAM 112, memory 114 connected directly to an IP block through a memory communications controller 106, on-chip memory enabled as an IP block 116, and on-chip caches. In NOC 102, either of the on-chip memories 114, 116, for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. Memory 116 on an IP block can be addressed from that IP block or from any other IP block in the NOC. Memory 114 attached directly to a memory communication controller can be addressed by the IP block that is adapted to the network by that memory communication controller—and can also be addressed from any other IP block anywhere in the NOC.

NOC 102 includes two memory management units ('MMUs') 120, 122, illustrating two alternative memory architectures for NOCs consistent with embodiments of the present invention. MMU 120 is implemented within an IP block, allowing a processor within the IP block to operate in virtual memory while allowing the entire remaining architecture of the NOC to operate in a physical memory address space. MMU 122 is implemented off-chip, connected to the NOC through a data communications port 124. The port 124 includes the pins and other interconnections required to conduct signals between the NOC and the MMU, as well as sufficient intelligence to convert message packets from the NOC packet format to the bus format required by the external MMU 122. The external location of the MMU means that all processors in all IP blocks of the NOC can operate in virtual memory address space, with all conversions to physical addresses of the off-chip memory handled by the off-chip MMU 122.

In addition to the two memory architectures illustrated by use of the MMUs 120, 122, data communications port 126 illustrates a third memory architecture useful in NOCs capable of being utilized in embodiments of the present invention. Port 126 provides a direct connection between an IP block 104 of the NOC 102 and off-chip memory 112. With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port 126. The port 126 includes the pins and other interconnections required to conduct signals between the NOC and the off-chip memory 112, as well as sufficient intelligence to convert message packets from the NOC packet format to the bus format required by the off-chip memory 112.

In the example of FIG. 2, one of the IP blocks is designated a host interface processor 128. A host interface processor 128 provides an interface between the NOC and a host computer 10 in which the NOC may be installed and also provides data processing services to the other IP blocks on the NOC, including, for example, receiving and dispatching among the IP blocks of the NOC data processing requests from the host computer. A NOC may, for example, implement a video graphics adapter 26 or a coprocessor 28 on a larger computer 10 as described above with reference to FIG. 1. In the example of FIG. 2, the host interface processor 128 is connected to the larger host computer through a data communications port 130. The port 130 includes the pins and other interconnections required to conduct signals between the NOC and the host computer, as well as sufficient intelligence to convert message packets from the NOC to the bus format required by the host computer 10. In the example of the NOC coprocessor in the computer of FIG. 1, such a port would provide data communications format translation between the link structure of the NOC coprocessor 28 and the protocol required for the front side bus 36 between the NOC coprocessor 28 and the bus adapter 18.

Figure 3:
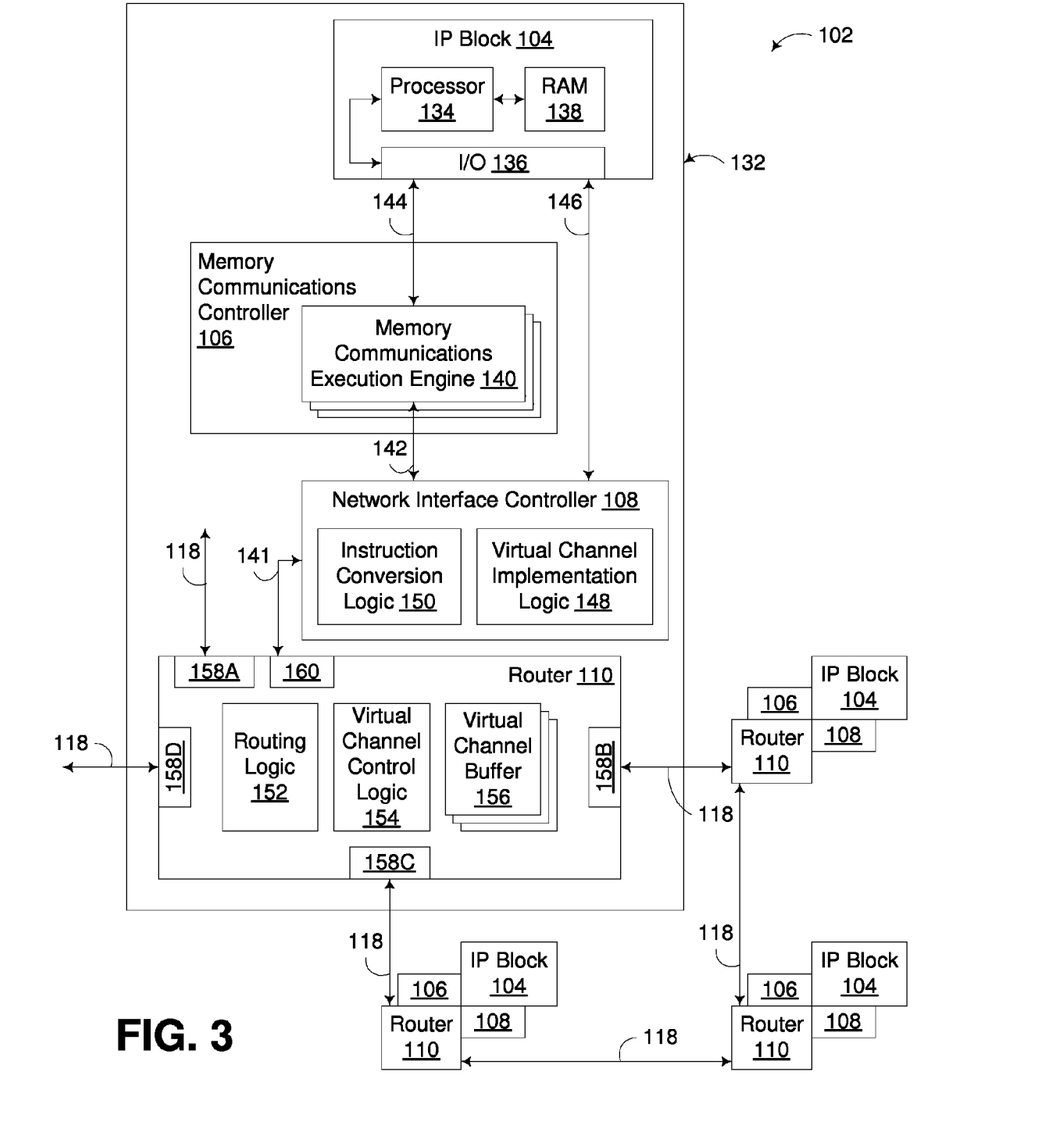
FIG. 3 is a block diagram illustrating in greater detail an exemplary implementation of a node from the NOC of FIG. 2.

FIG. 3 next illustrates a functional block diagram illustrating in greater detail the components implemented within an IP block 104, memory communications controller 106, network interface controller 108 and router 110 in NOC 102, collectively illustrated at 132. IP block 104 includes a computer processor 134 and I/O functionality 136. In this example, computer memory is represented by a segment of random access memory ('RAM') 138 in IP block 104. The memory, as described above with reference to FIG. 2, can occupy segments of a physical address space whose contents on each IP block are addressable and accessible from any IP block in the NOC. The processors 134, I/O capabilities 136, and memory 138 in each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In NOC 102 of FIG. 3, each memory communications controller 106 includes a plurality of memory communications execution engines 140. Each memory communications execution engine 140 is enabled to execute memory communications instructions from an IP block 104, including bidirectional memory communications instruction flow 141, 142, 144 between the network and the IP block 104. The memory communications instructions executed by the memory communications controller may originate, not only from the IP block adapted to a router through a particular memory communications controller, but also from any IP block 104 anywhere in NOC 102. That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine 140 is enabled to execute a complete memory communications instruction separately and in parallel with other memory communications execution engines. The memory communications execution engines implement a scalable memory transaction processor optimized for concurrent throughput of memory communications instructions. Memory communications controller 106 supports multiple memory communications execution engines 140 all of which run concurrently for simultaneous execution of multiple memory communications instructions. A new memory communications instruction is allocated by the memory communications controller 106 to a memory communications engine 140 and memory communications execution engines 140 can accept multiple response events simultaneously. In this example, all of the memory communications execution engines 140 are identical. Scaling the number of memory communications instructions that can be handled simultaneously by a memory communications controller 106, therefore, is implemented by scaling the number of memory communications execution engines 140.

In NOC 102 of FIG. 3, each network interface controller 108 is enabled to convert communications instructions from command format to network packet format for transmission among the IP blocks 104 through routers 110. The communications instructions may be formulated in command format by the IP block 104 or by memory communications controller 106 and provided to the network interface controller 108 in command format. The command format may be a native format that conforms to architectural register files of IP block 104 and memory communications controller 106. The network packet format is typically the format required for transmission through routers 110 of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In NOC 102 of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC —regardless of which IP block originated any particular memory-address-based communication. Thus, in NOC 102, all memory-address-based communications that are executed with message traffic are passed from the memory communications controller to an associated network interface controller for conversion from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller 106 is naturally also the network location of that memory communication controller's associated router 110, network interface controller 108, and IP block 104. The instruction conversion logic 150 within each network interface controller is capable of converting memory addresses to network addresses for purposes of transmitting memory-address-based communications through routers of a NOC.

Upon receiving message traffic from routers 110 of the network, each network interface controller 108 inspects each packet for memory instructions. Each packet containing a memory instruction is handed to the memory communications controller 106 associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In NOC 102 of FIG. 3, each IP block 104 is enabled to bypass its memory communications controller 106 and send inter-IP block, network-addressed communications 146 directly to the network through the IP block's network interface controller 108. Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through I/O functions 136 directly to the IP block's network interface controller in command format, then converted to packet format by the network interface controller and transmitted through routers of the NOC to another IP block. Such network-addressed communications 146 are bi-directional, potentially proceeding to and from each IP block of the NOC, depending on their use in any particular application. Each network interface controller, however, is enabled to both send and receive such communications to and from an associated router, and each network interface controller is enabled to both send and receive such communications directly to and from an associated IP block, bypassing an associated memory communications controller 106.

Each network interface controller 108 in the example of FIG. 3 is also enabled to implement virtual channels on the network, characterizing network packets by type. Each network interface controller 108 includes virtual channel implementation logic 148 that classifies each communication instruction by type and records the type of instruction in a field of the network packet format before handing off the instruction in packet form to a router 110 for transmission on the NOC. Examples of communication instruction types include inter-IP block network-address-based messages, request messages, responses to request messages, invalidate messages directed to caches; memory load and store messages; and responses to memory load messages, etc.

Each router 110 in the example of FIG. 3 includes routing logic 152, virtual channel control logic 154, and virtual channel buffers 156. The routing logic typically is implemented as a network of synchronous and asynchronous logic that implements a data communications protocol stack for data communication in the network formed by the routers 110, links 118, and bus wires among the routers. Routing logic 152 includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed.

In describing memory-address-based communications above, each memory address was described as mapped by network interface controllers to a network address, a network location of a memory communications controller. The network location of a memory communication controller 106 is naturally also the network location of that memory communication controller's associated router 110, network interface controller 108, and IP block 104. In inter-IP block, or network-address-based communications, therefore, it is also typical for application-level data processing to view network addresses as the location of an IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In NOC 102 of FIG. 3, each router 110 implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router 110 in the example of FIG. 3 also includes virtual channel control logic 154 and virtual channel buffers 156. The virtual channel control logic 154 examines each received packet for its assigned communications type and places each packet in an outgoing virtual channel buffer for that communications type for transmission through a port to a neighboring router on the NOC.

Each virtual channel buffer 156 has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer 156 in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller 108. Each network interface controller is configured to, upon receipt of such a signal, refuse to accept, from its associated memory communications controller 106 or from its associated IP block 104, communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped. When a router encounters a situation in which a packet might be dropped in some unreliable protocol such as, for example, the Internet Protocol, the routers in the example of FIG. 3 may suspend by their virtual channel buffers 156 and their virtual channel control logic 154 all transmissions of packets in a virtual channel until buffer space is again available, eliminating any need to drop packets. The NOC of FIG. 3, therefore, may implement highly reliable network communications protocols with an extremely thin layer of hardware.

The example NOC of FIG. 3 may also be configured to maintain cache coherency between both on-chip and off-chip memory caches. Each NOC can support multiple caches each of which operates against the same underlying memory address space. For example, caches may be controlled by IP blocks, by memory communications controllers, or by cache controllers external to the NOC. Either of the on-chip memories 114, 116 in the example of FIG. 2 may also be implemented as an on-chip cache, and, within the scope of the present invention, cache memory can be implemented off-chip also.

Each router 110 illustrated in FIG. 3 includes five ports, four ports 158A-D connected through bus wires 118 to other routers and a fifth port 160 connecting each router to its associated IP block 104 through a network interface controller 108 and a memory communications controller 106. As can be seen from the illustrations in FIGS. 2 and 3, the routers 110 and the links 118 of the NOC 102 form a mesh network with vertical and horizontal links connecting vertical and horizontal ports in each router. In the illustration of FIG. 3, for example, ports 158A, 158C and 160 are termed vertical ports, and ports 158B and 158D are termed horizontal ports.

Figure 4:
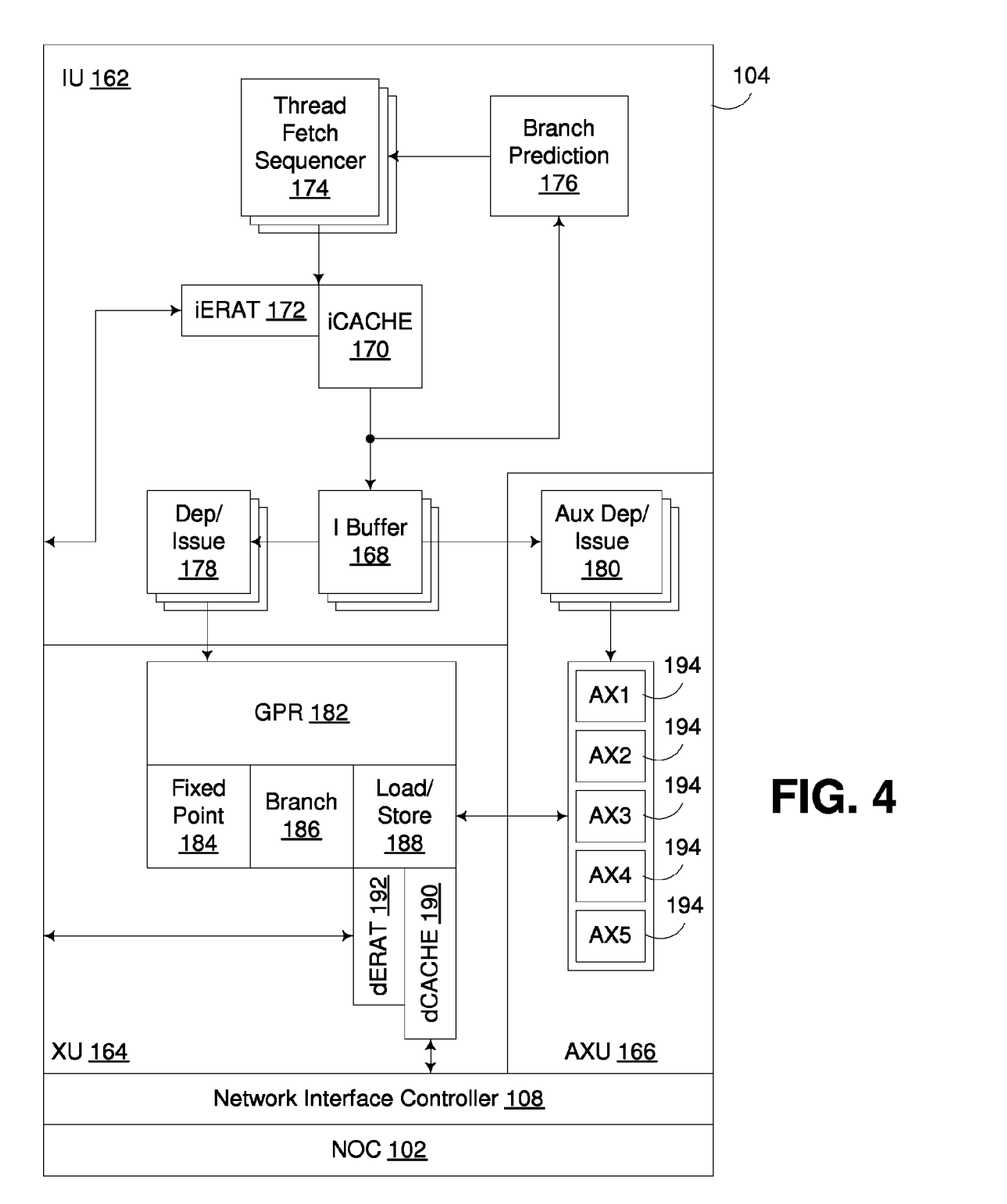
FIG. 4 is a block diagram illustrating an exemplary implementation of an IP block from the NOC of FIG. 2.

FIG. 4 next illustrates in another manner one exemplary implementation of an IP block 104 consistent with the invention, implemented as a processing element partitioned into an instruction unit (IU) 162, execution unit (XU) 164 and auxiliary execution unit (AXU) 166. In the illustrated implementation, IU 162 includes a plurality of instruction buffers 168 that receive instructions from an L1 instruction cache (iCACHE) 170. Each instruction buffer 168 is dedicated to one of a plurality, e.g., four, symmetric multithreaded (SMT) hardware threads. An effective-to-real translation unit (iERAT) 172 is coupled to iCACHE 170, and is used to translate instruction fetch requests from a plurality of thread fetch sequencers 174 into real addresses for retrieval of instructions from lower order memory. Each thread fetch sequencer 174 is dedicated to a particular hardware thread, and is used to ensure that instructions to be executed by the associated thread is fetched into the iCACHE for dispatch to the appropriate execution unit. As also shown in FIG. 4, instructions fetched into instruction buffer 168 may also be monitored by branch prediction logic 176, which provides hints to each thread fetch sequencer 174 to minimize instruction cache misses resulting from branches in executing threads.

IU 162 also includes a dependency/issue logic block 178 dedicated to each hardware thread, and configured to resolve dependencies and control the issue of instructions from instruction buffer 168 to XU 164. In addition, in the illustrated embodiment, separate dependency/issue logic 180 is provided in AXU 166, thus enabling separate instructions to be concurrently issued by different threads to XU 164 and AXU 166. In an alternative embodiment, logic 180 may be disposed in IU 162, or may be omitted in its entirety, such that logic 178 issues instructions to AXU 166.

XU 164 is implemented as a fixed point execution unit, including a set of general purpose registers (GPR's) 182 coupled to fixed point logic 184, branch logic 186 and load/store logic 188. Load/store logic 188 is coupled to an L1 data cache (dCACHE) 190, with effective to real translation provided by dERAT logic 192. XU 164 may be configured to implement practically any instruction set, e.g., all or a portion of a 32b or 64b PowerPC instruction set.

AXU 166 operates as an auxiliary execution unit including dedicated dependency/issue logic 180 along with one or more execution blocks 194. AXU 166 may include any number of execution blocks, and may implement practically any type of execution unit, e.g., a floating point unit, or one or more specialized execution units such as encryption/decryption units, coprocessors, vector processing units, graphics processing units, XML processing units, etc. In the illustrated embodiment, AXU 166 includes a high speed auxiliary interface to XU 164, e.g., to support direct moves between AXU architected state and XU architected state.

Communication with IP block 104 may be managed in the manner discussed above in connection with FIG. 2, via network interface controller 108 coupled to NOC 102. Address-based communication, e.g., to access L2 cache memory, may be provided, along with message-based communication. For example, each IP block 104 may include a dedicated in box and/or out box in order to handle inter-node communications between IP blocks.

Embodiments of the present invention may be implemented within the hardware and software environment described above in connection with FIGS. 1-4. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

Grouped Pixel Texture Processing

Figure 5:
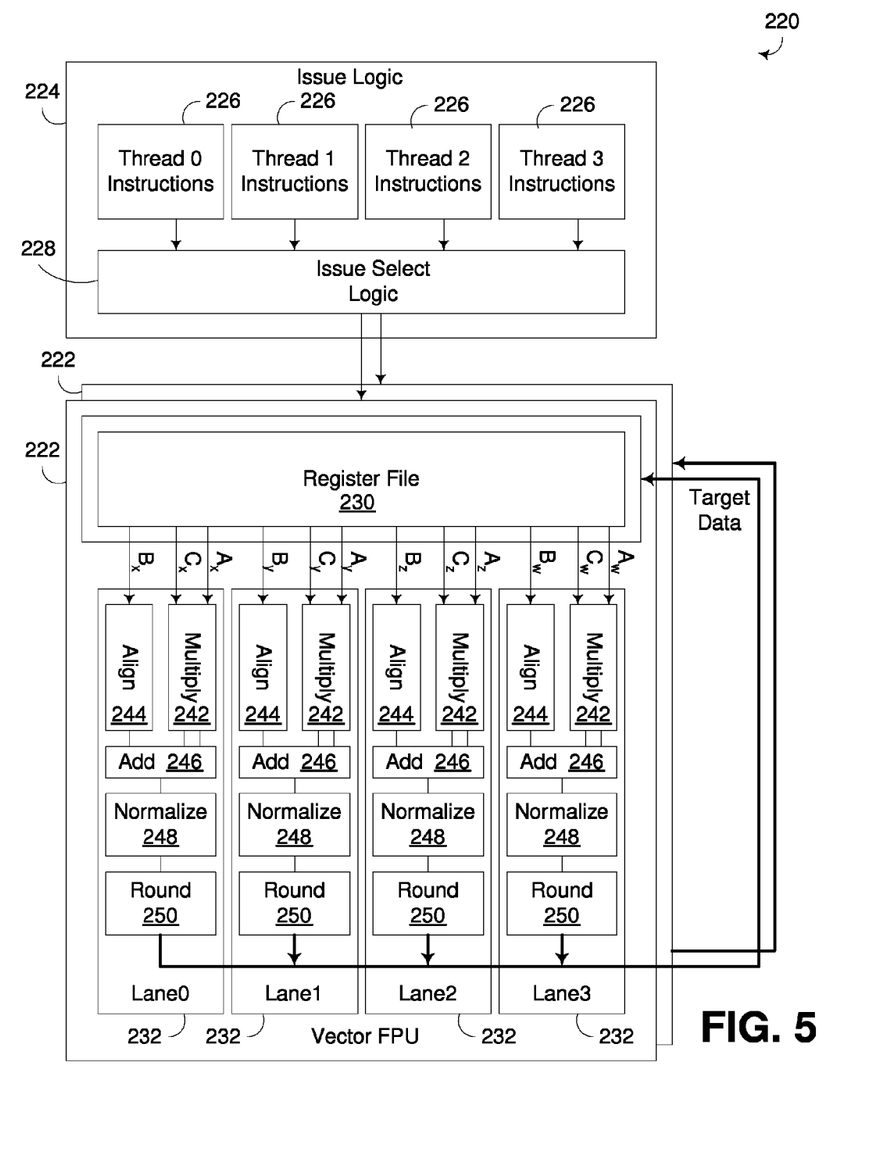
FIG. 5 is a block diagram of an SIMD execution unit capable of implementing grouped pixel texture processing in a manner consistent with the invention, and capable of being implemented within an IP block from the NOC of FIG. 2.

Turning now to FIG. 5, this figure illustrates an exemplary processing unit 220 incorporating one or more SIMD execution units 222 suitable for performing efficient texture processing of pixel groups consistent with the invention. Processing unit 220 may be implemented, for example, in an IP block such as an IP block 104 from FIGS. 1-4. In the alternative, processing unit 220 may be implemented in other processor architectures that issue and execute instructions, including single or multi-core microprocessors or microcontrollers.

Each SIMD execution unit 222 processes instructions issued to the execution unit by issue logic 224, and includes a register file 230 coupled to a plurality of processing lanes or sub-units 232 (e.g., four processing lanes) capable of processing data stored in register file 230 based upon the instructions issued by issue logic 224, and storing target data back to the register file. Each SIMD execution unit 222 may be implemented as a number of different types of execution units, e.g., floating point units, fixed point units, or specialized execution units such as graphics processing units, encryption/decryption units, coprocessors, XML processing units, etc., for which vector-based processing may be required or desirable.

Issue logic 224 in processing unit 220 functions as control logic and includes issue select logic 228 that is capable of issuing instructions from a plurality of threads (e.g., four threads), illustrated at 226. Issue select logic 228 operates to schedule the issuance of instructions by the various threads, and typically includes logic for managing dependencies between instructions, in a manner generally understood in the art. When multiple SIMD execution units 222 are supported, issue select logic 228 is capable of issuing multiple instructions to the multiple execution units each cycle. In some embodiments, however, only one execution unit may be supported, and furthermore, in some embodiments multithreaded issue of instructions may not be supported.

SIMD execution unit 220 is specifically implemented as an SIMD floating point unit, e.g., as used for image processing. Given the configuration of processing unit 220 as a floating point unit usable in image processing applications, each processing lane 232 is configured to process floating point instructions. While a wide variety of other floating point architectures may be used in the alternative, processing unit 220 includes a pipelined floating point execution architecture capable of operating on three vector operands, denoted A, B and C. For vector operations, four word vectors are supported, with the words in each vector being denoted as X, Y, Z and W (e.g., where X, Y, Z, and W refer to the coordinates of a vertex), and as such, each processing lane 232 receives three operand words, one from each vector. Thus, for example, for the processing lane 232 that processes the X word from each vector, the operands fed to that processing lane are denoted as $A_x$, $B_x$ and $C_x$.

Each processing lane 232 is configured to perform an operation in parallel with one or more other processing lanes. For example, each processing lane may multiply a pair of operands to perform a cross product or dot product operation. By multiplying different pairs of operands in different processing lanes of the vector unit, vector operations may be performed faster and more efficiently.

Each processing lane 232 is also pipelined to further improve performance. Accordingly, each processing lane 232 includes a plurality of pipeline stages for performing one or more operations on the operands. For example, for a first stage, each processing lane may include a multiplier 242 for multiplying the A and C operands. In one embodiment of the invention, the multiplication of operands may be performed in a first stage of the pipeline as illustrated in FIG. 5.

Each processing lane 232 may also include an aligner 244 for aligning operand B with the product computed by multiplier 242, in parallel with the computation of the product.

While alignment is shown in the same pipeline stage in FIG. 5, one skilled in the art will recognize that the multiplication and alignment may be performed in separate pipeline stages in other embodiments.

Each processing lane 232 may also include an adder 246 for adding two or more operands. In one embodiment (illustrated in FIG. 5), each adder 246 is configured to receive the product computed by multiplier 242 (output as a sum and carry), and add the product to the aligned operand output by aligner 244. Therefore, each processing lane 232 may be configured to perform a multiply-add instruction. One skilled in the art will recognize that multiply-add instructions are frequently performed in vector operations. Therefore, by performing several multiply add instructions in parallel lanes, the efficiency of vector processing may be significantly improved.

Each vector processing lane 232 may also include a normalizing stage, and a rounding stage, as illustrated in FIG. 5. Accordingly, a normalizer 248 may be provided in each processing lane. Normalizer 248 may be configured to represent a computed value in a convenient exponential format. For example, normalizer 248 may receive the value 0.0000063 as a result of an operation. Normalizer 248 may convert the value into a more suitable exponential format, for example, $6.3 \times 10-6$. The rounding stage may incorporate a router 250 that is capable of rounding a computed value to a desired number of decimal points. For example, a computed value of 10.5682349 may be rounded to 10.568 if only three decimal places are desired in the result. In one embodiment of the invention rounder 250 may round the least significant bits of the particular precision floating point number the rounder is designed to work with.

One skilled in the art will recognize that embodiments of the invention are not limited to the particular pipeline stages, components, and arrangement of components described above and in FIG. 5. For example, in some embodiments, aligner 244 may be configured to align operand B, a product computed by multiplier 242, or both. Furthermore, embodiments of the invention are not limited to the particular components described in FIG. 5. Any combination of the illustrated components and additional components such as, but not limited to, leading zero adders, dividers, etc. may be included in each processing lane 232 consistent with the invention.

It will also be appreciated that a number of different register file architectures may be used consistent with the invention. For example, register file 230 may be implemented with 128 quadword (128b) vector registers, or any different number and/or differently sized vector registers as appropriate.

Figure 6:
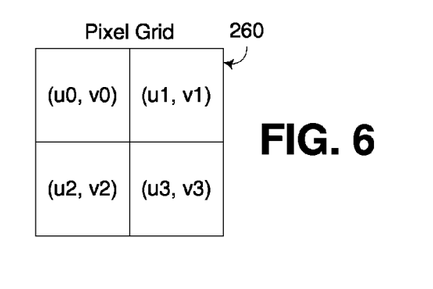
FIG. 6 is a block diagram of an exemplary 2×2 group of pixels capable of being concurrently processed by the SIMD execution unit of FIG. 5 during grouped pixel texture processing consistent with the invention.
Figure 7:
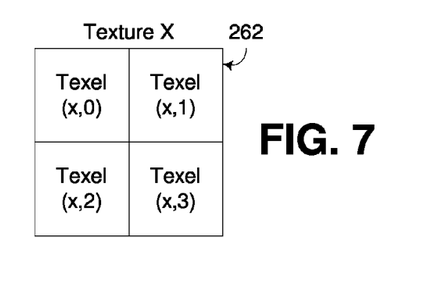
FIG. 7 is a block diagram of a portion of an exemplary texture capable of being used by the SIMD execution unit of FIG. 5 during grouped pixel texture processing consistent with the invention.
Figure 8:
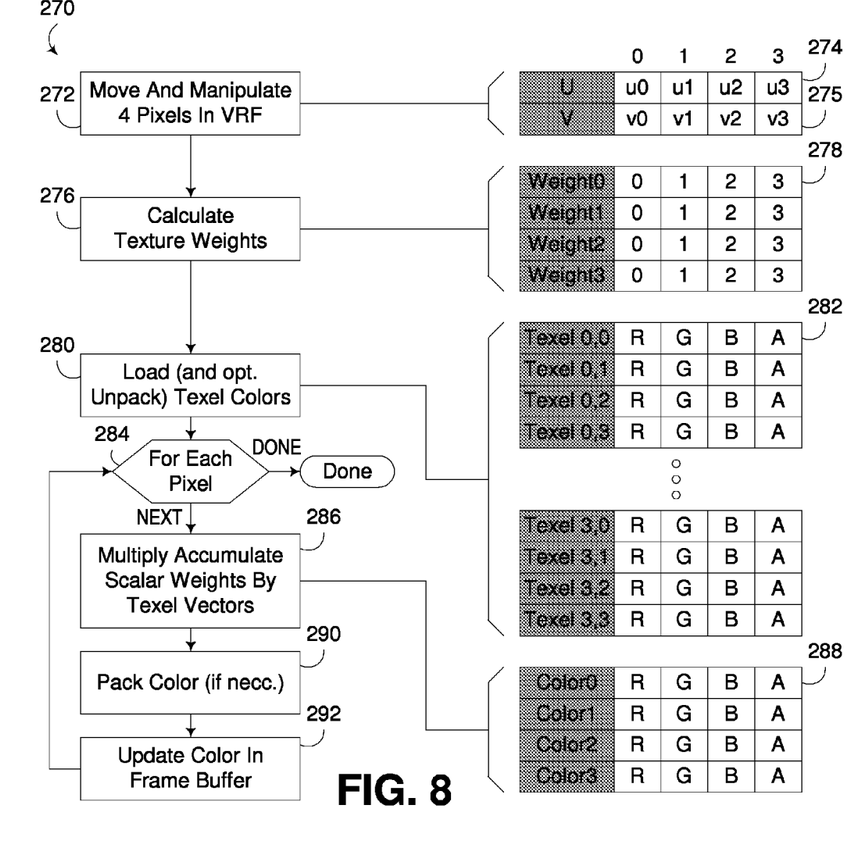
FIG. 8 is a flowchart illustrating a grouped pixel texture processing algorithm capable of being implemented by the SIMD execution unit of FIG. 5, and additionally illustrating data vectors used in selected operations performed by the algorithm.

Now turning to FIGS. 6-8, these figures illustrate a grouped pixel texture processing algorithm consistent with the invention, and suitable for implementation in processing unit 220 of FIG. 5. FIG. 6, in particular illustrates an exemplary pixel group or grid 260, including a 2×2 grid of pixels designated by coordinates (u0, v0), (u1, v1), (u2, v2) and (u3, v3). Pixels are identified herein by the variable X, such that for the upper left pixel in the pixel group, X=0, for the upper right pixel, X=1, for the lower left pixel, X=2, and for the lower right pixel, X=3. In the illustrated embodiment, it is desirable for all pixels in a group to be from the same geometric primitive, and in addition, be geometrically adjacent to one another to form a contiguous region on a primitive. With all pixels from the same primitive, the same texture may be applied to all of the pixels, which enables a single texture data structure, e.g., a texture context data structure, to be referenced by all of the pixels. In other embodiments, however, different textures may be applied to different pixels in a pixel group.

In addition, while the illustrated embodiment is based on a 2×2 grid of pixels, it will be appreciated that other geometries and numbers of pixels may be defined in a pixel group, e.g., 1×n, n×n, n×m, etc. The number of pixels in a group will typically be dependent upon the number of processing lanes and/or the number of scalar values capable of being stored in a vector, such that scalar calculations associated with texture processing can be grouped and performed concurrently for all of the pixels in a group. Even, however, if a pixel group included more pixels than could be concurrently processed in the same vector, performance improvements could nonetheless be obtained through grouping the scalar operations. As an example, for a pixel group of eight pixels, the scalar operations for the eight pixels could be grouped into two groups of four pixels and processed in two SIMD operations.

FIG. 7 illustrates an exemplary portion 262 of a texture X, representing four adjacent texels (X, 0), (X, 1), (X, 2) and (X, 3) to pixel X in a texture. In the illustrated embodiment, bilinear filtering is performed based upon the four most proximate texels to a particular (u, v) pixel coordinate are used to generate a color to apply to the pixel. It will be appreciated that for different filtering techniques, different numbers and arrangements of texels may be used in a filtering calculation; thus texture 262 in FIG. 7 does not limit the invention to any particular filtering technique.

The "X" designation for texture 262 refers to an associated pixel in a pixel group. Thus, for the first pixel in pixel group 260, designated as (u0, v0), the adjacent texels to that pixel are designated as texels (0, 0), (0, 1), (0, 2) and (0, 3). Texels are hereinafter identified herein by the variable Y, such that for the upper left texel, Y=0, for the upper right texel, Y=1, for the lower left texel, Y=2, and for the lower right texel, Y=3. Texel (X, Y) therefore refers to the Yth texel for pixel X. It will be appreciated that the texture 262 for each pixel in the pixel group will refer to either a different set of texels from the same texture, e.g., the same bitmapped texture or the same procedural texture, or to texels from different texels (in the event the pixels in the pixel group are from different primitives).

Now turning to FIG. 8, this figure illustrates a grouped pixel texture processing algorithm 270 capable of being implemented by processing unit 220 of FIG. 5, and additionally illustrating the data vectors used in selected operations performed by the algorithm. In one embodiment, processing unit 220 may function as a texture processor disposed in a software-based rendering pipeline implemented on a NOC, and fed by an earlier rasterizer stage of the pipeline disposed on a different node in the NOC. The processing unit may be one of multiple texture processor instances in a texture processing stage, such that the texture processing workload may be performed in parallel by multiple processing units. The rasterizer stage may include one or more rasterizer instances that feed groups of pixels to different texture processor instances to accelerate texture processing of a rendered scene in a parallel fashion.

Algorithm 270 may be implemented as a routine, i.e., in program code executed by the processing unit to map a texture to a group of pixels in a manner consistent with the invention. When implemented as a routine, the algorithm may receive as input the four pixels to be processed as a group by the processing unit, typically defined in (u, v) coordinates in the texture domain as generated by the rasterizing stage. The algorithm also typically receives as input a pointer to a texture context or other data structure that stores, for example, a pointer to a bitmapped texture in memory or a pointer to program code that implements a procedural texture, size information about the texture, the type of filtering to be performed with the texture, and other information that may be useful in applying the texture to primitives in a rendered scene. The input data may be provided, for example, using inter-node message passing in the NOC, or alternatively using shared memory.

In other embodiments, only a subset of the pixels in a group may be passed as input, with the other pixels generated dynamically. In the case of a 2×2 pixel grid, it may be desirable in some embodiments to only provide as input the upper left (u0, v0) and bottom right (u3, v3) pixel coordinates as input to the algorithm, and dynamically generate the other two pixel coordinates (u1, v1) and (u2, v2) based upon an assumption that the pixels are arranged in a regular grid, so the (u1, v1) pixel is equivalent to (u3, v0) and the (u2, v2) pixel is equivalent to (u0, v3). Also, it may be desirable when sending only portions of pixel groups to change the arrangement of pixels in different pixel groups, e.g., to switch from 2×2 groups to 1×4 groups, e.g., when it is determined that perspective errors may arise in 2×2 groups for certain primitives.

Algorithm 270 thus begins in block 272 by moving and manipulating four (u, v) pixel coordinates into two vector registers in the vector register file (VRF). In particular, the u coordinates for the pixels in the pixel group are packed or grouped into a single u vector 274, while the v coordinates for the pixels in the pixel group are packed or grouped into a single v vector 275, and stored in separate vector registers in the vector register file. Thus for each pixel X, the associated uX and vX coordinates are organized in the associated word X in vectors 274, 275, and will be processed in the associated processing lane X in SIMD execution unit 222 (FIG. 5).

Next, in block 276, a plurality of texture weights are calculated for each pixel. For example, where a bilinear filtering algorithm based upon four adjacent texels is used, four weights (weight0-weight3), respectively associated with texels (0, 0), (0, 1), (0, 2) and (0, 3) in the associated texture, are calculated for each pixel based upon the distance from the associated texel to the (u, v) coordinate for the pixel. As the calculation of weights for four adjacent texels to a given (u, v) coordinate can be performed as a scalar operation, the scalar calculation of weights for all of the pixels in a pixel group can be packed or grouped together in the same SIMD operation, and the results stored in the same vector. Consequently, block 276 generates a plurality of vectors 278, with each vector 278 storing in each word X one of four weights calculated for a given pixel X. Thus, for example, the Weight0 vector 278 may include weights associated with texels (0, 0), (1, 0), (2, 0) and (2, 0) respectively disposed in words 0, 1, 2 and 3 of the vector. As such, a scalar weight value stored in a word X of one of vectors 278 may generically be identified hereinafter as weightY.X, where Y is the associated texel ID for the weight and X is the pixel ID. The weight vectors 278 are stored in separate registers in the vector register file.

Next, in block 280, the texel colors for each texel are loaded from the texture data structure(s) and stored in vector registers in the vector register file. For example, each texel color may be represented as a four word floating point vector 282 including red (R), green (G), blue (B) and alpha (A) values. The texel colors may alternatively be stored in a texture data structure in a packed or compress format, e.g., as four 8-bit integers, whereby block 280 may additionally unpack the colors into four 32-bit floating point values prior to storing in a vector register. If the texture is procedural, the colors may also be generated dynamically, rather than loaded directly from a texture data structure. In addition, it will be appreciated that other color representations (e.g., RGB) may be used in the alternative.

Consequently, for each pixel X, color vectors 282 will be stored in the vector register file for the colors assigned to each of the four texels in the texture associated with the pixel. For pixel 0, therefore, four color vectors 282 will be stored in the register file, designated as texel (0, 0), (0, 1), (0, 2) and (0, 3). The individual color values within each vector will be designated as $R_{(X, Y)}$, $G_{(X, Y)}$, $B_{(X, Y)}$, and $A_{(X, Y)}$ for the purposes of this discussion. With four pixels in the pixel group, sixteen color vectors 282 will therefore be loaded in block 280.

Next, block 284 implements a FOR loop to process each of the four pixels in the pixel group. For each such pixel, a multiply accumulate vector operation is performed to multiply each scalar weight for the pixel by its associated color vector, and then sum the results of the four multiplies to generate a color update vector for the pixel. Thus, for pixel 0, four vector multiplies are performed:

Weight0.0*($R_{(0, 0)}$, $G_{(0, 0)}$, $B_{(0, 0)}$, $A_{(0, 0)}$)
Weight1.0*($R_{(0, 1)}$, $G_{(0, 1)}$, $B_{(0, 1)}$, $A_{(0, 1)}$)
Weight2.0*($R_{(0, 2)}$, $G_{(0, 2)}$, $B_{(0, 2)}$, $A_{(0, 2)}$)
Weight3.0*($R_{(0, 3)}$, $G_{(0, 3)}$, $B_{(0, 3)}$, $A_{(0, 3)}$)

The results of these multiplies are accumulated in a manner known in the art to generate a color update vector 288 for each pixel. The vector sum of the above multiplies for pixel 0 is therefore illustrated in FIG. 8 as color0 vector 288. Once the color update vector 288 is calculated, an optional step of repacking the color vector is performed in block 290 (if unpacking was required in block 280), and the color for the pixel in the image or frame buffer is updated in block 292. In some embodiments, block 292 may simply store the color update vector in the image or frame buffer, while in other embodiments, a read modify write operation may be performed to blend the new color update vector with the existing value already stored in the image or frame buffer.

Once the color has been updated in block 292, control returns to block 284 to process the remaining pixels in a similar manner. Once all pixels have been processed, algorithm 270 is complete.

It will be appreciated that blocks 286, 290 and 292, which are performed for each pixel, may be performed sequentially as illustrated in FIG. 8, or in the alternative, may be performed concurrently, e.g., using multiple SIMD execution units. Operations performed for each pixel may also be interleaved with one another, e.g., by using different threads of execution.

In addition, returning to block 286, the multiply operations performed in this block may be assisted in some embodiments using either permute operations or swizzle operations to replicate the scalar weight across each lane of the SIMD execution unit to multiply the scalar weight by the respective RGBA value for the respective color vector. With a permute operation, a permute instruction may be used to generate a vector in a register including the scalar weight value replicated in each word of the vector, such that a vector multiply can be performed between the permuted vector and each color vector for the pixel. With a swizzle operation, multiplexers in the SIMD execution unit may be used to route the scalar weight value to each processing lane of the SIMD execution unit, e.g., in response to a swizzle instruction, to avoid the use of a separate register.

It will be appreciated by one of ordinary skill in the art that by grouping pixels into groups and performing texture coordinate and filtering setup operations (e.g., as discussed above in connection with blocks 272 and 276) as SIMD operations, a SIMD execution unit is used more efficiently during the texture coordinate and filtering setup operations during texture processing. By coupling these operations with vector math operations when applying the texture filters to the pixels, most if not all of the lanes of an SIMD execution unit are fully utilized at all points when applying textures to pixels in a rendered scene. In addition, unfolding the work in the manner described above often reduces dependencies and increases overall processing throughput. The four groups of multiply accumulate vector operations performed for the four pixels in a group in block 286 (sixteen accumulated multiplies) in particular are all independent of one another, and can be processed in an SIMD execution unit with no bubbles.

It will also be appreciated that some bubbles may nonetheless be introduced in a pipelined SIMD execution unit implementing algorithm 270, e.g., due to dependencies during calculation of the weight vectors. However, through the use of multiple threads to process multiple groups of pixels at the same time, the number of bubbles can be substantially reduced. In a four threaded processing unit with two SIMD execution units (e.g., with two threads tied to each SIMD execution unit), 16 pixels may be processed concurrently, and with high utilization of both SIMD execution units.

Various modifications may be made without departing from the spirit and scope of the invention. Therefore, the invention lies in the claims hereinafter appended.

What is claimed is:

1. A circuit arrangement, comprising:
   a processing unit including a single instruction multiple data (SIMD) execution unit, the SIMD execution unit including a plurality of processing lanes and a vector register file; and
   program code configured to be executed by the processing unit to apply at least one texture to a plurality of pixels in a graphic image by processing pixels in groups, the program code configured to load data associated with each pixel in a group of pixels into a common vector register from the vector register file, concurrently perform at least one scalar operation for each pixel in the group of pixels by operating on the common vector register with the SIMD execution unit such that the data associated with each pixel in the group of pixels is processed in a separate processing lane in the SIMD execution unit, and perform at least one vector operation for each pixel in the group of pixels using the SIMD execution unit, wherein the program code is configured to perform the vector operation by performing a mathematical operation with a scalar value associated with one of the pixels in the group and stored in a first vector register in the vector register file and a vector value stored in a second vector register in the vector register file, wherein the program code is further configured to perform a permute operation to permute the scalar value associated with the one of the pixels in the group into multiple words in a third vector register, and perform the mathematical operation with the scalar value by performing a mathematical operation as a vector operation using the second and third vector registers.

2. The circuit arrangement of claim 1, wherein the processing unit includes multi-threaded issue logic, and wherein the program code is configured to concurrently process pixels from multiple groups of pixels in the SIMD execution unit using multiple threads.

3. The circuit arrangement of claim 1, wherein the SIMD execution unit is a first SIMD execution unit, wherein the processing unit includes a second SIMD execution unit and issue logic configured to issue instructions to the first and second SIMD execution units, wherein the program code is configured to concurrently process pixels from a first group of pixels and a second group of pixels using the first SIMD execution unit and the second SIMD execution unit, respectively.

4. The circuit arrangement of claim 1, wherein the SIMD execution unit includes N processing lanes, wherein each group of pixels includes N pixels, wherein the common vector register includes N words, and wherein the program code is configured to load data associated with each of the N pixels in separate words of the common vector register and concurrently perform the scalar operation for each pixel in the group of pixels by causing the data associated with each of the N pixels to be concurrently processed by separate processing lanes in the SIMD execution unit.

5. The circuit arrangement of claim 4, wherein N is equal to four.

6. The circuit arrangement of claim 1, wherein the program code is configured to load data associated with each pixel in a group of pixels into the common vector register from the vector register file includes loading a u coordinate for each pixel in the group of pixels into a first vector register in the vector register file and loading a v coordinate for each pixel in the group of pixels into a second vector register in the vector register file.

7. An integrated circuit device including the circuit arrangement of claim 1.

8. A program product comprising a non-transitory computer readable medium and logic definition program code resident on the computer readable medium and defining the circuit arrangement of claim 1.

9. A circuit arrangement, comprising:
   a processing unit including a single instruction multiple data (SIMD) execution unit, the SIMD execution unit including a plurality of processing lanes and a vector register file; and
   program code configured to be executed by the processing unit to apply at least one texture to a plurality of pixels in a graphic image by processing pixels in groups, the program code configured to load data associated with each pixel in a group of pixels into a common vector register from the vector register file, concurrently perform at least one scalar operation for each pixel in the group of pixels by operating on the common vector register with the SIMD execution unit such that the data associated with each pixel in the group of pixels is processed in a separate processing lane in the SIMD execution unit, and perform at least one vector operation for each pixel in the group of pixels using the SIMD execution unit, wherein the program code is configured to perform the vector operation by performing a mathematical operation with a scalar value associated with one of the pixels in the group and stored in a first vector register in the vector register file and a vector value stored in a second vector register in the vector register file, and wherein the program code is further configured to swizzle the scalar value into a vector prior to performing the mathematical operation with the scalar value and the second vector register such that the mathematical operation is performed as a vector operation.

10. A circuit arrangement, comprising:
    a processing unit including a single instruction multiple data (SIMD) execution unit, the SIMD execution unit including a plurality of processing lanes and a vector register file; and
    program code configured to be executed by the processing unit to apply at least one texture to a plurality of pixels in a graphic image by processing pixels in groups, the program code configured to load data associated with each pixel in a group of pixels into a common vector register from the vector register file, concurrently perform at least one scalar operation for each pixel in the group of pixels by operating on the common vector register with the SIMD execution unit such that the data associated with each pixel in the group of pixels is processed in a separate processing lane in the SIMD execution unit, and perform at least one vector operation for each pixel in the group of pixels using the SIMD execution unit, wherein the program code is configured to load data associated with each pixel in a group of pixels into the common vector register from the vector register file includes loading a u coordinate for each pixel in the group of pixels into a first vector register in the vector register file and loading a v coordinate for each pixel in the group of pixels into a second vector register in the vector register file, wherein the program code is configured to concurrently perform at least one scalar operation for each pixel in the group of pixels by calculating a plurality of filtering weights for each pixel in the group of pixels using the first and second vector registers, wherein each filtering weight is associated with a texel disposed in a texture proximate the u and v coordinates for an associated pixel.

11. The circuit arrangement of claim 10, wherein the group of pixels includes at least first and second pixels, wherein the program code is configured to calculate the plurality of filtering weights for each pixel in the group of pixels by, in a first scalar operation, concurrently calculating a first filtering weight for each of the first and second pixels and storing the first filtering weights for the first and second pixels in a third vector register in the vector register file, and in a second scalar operation, concurrently calculating a second filtering weight for each of the first and second pixels and storing the second filtering weights for the first and second pixels in a fourth vector register in the vector register file.

12. The circuit arrangement of claim 11, wherein the program code is configured to load a plurality of color vectors into the vector register file, each color vector associated with a texel for which a filtering weight has been calculated, and wherein the program code is configured to perform the at least one vector operation for each pixel in the group of pixels by, for the first pixel, performing a plurality of vector multiplication operations, each operation multiplying a filtering weight calculated for the first pixel with a color vector associated with such filtering weight, and summing results of the plurality of vector multiplication operations to generate a color update vector for the first pixel.

13. The circuit arrangement of claim 12, wherein the program code is further configured to store the color update vector in a frame buffer.

14. A method of applying textures to a plurality of pixels in a graphic image using a processing unit that includes a single instruction multiple data (SIMD) execution unit, wherein the SIMD execution unit is of the type including a plurality of processing lanes and a vector register file, the method comprising, for a group of pixels in a graphic image:
loading data associated with each pixel in the group of pixels into a common vector register from the vector register file, wherein loading data associated with each pixel in a group of pixels into a common vector register from the vector register file includes loading a u coordinate for each pixel in the group of pixels into a first vector register in the vector register file and loading a v coordinate for each pixel in the group of pixels into a second vector register in the vector register file;
concurrently performing at least one scalar operation for each pixel in the group of pixels by operating on the common vector register with the SIMD execution unit such that the data associated with each pixel in the group of pixels is processed in a separate processing lane in the SIMD execution unit, wherein concurrently performing at least one scalar operation for each pixel in the group of pixels includes calculating a plurality of filtering weights for each pixel in the group of pixels using the first and second vector registers, wherein each filtering weight is associated with a texel disposed in a texture proximate the u and v coordinates for an associated pixel; and
performing at least one vector operation for each pixel in the group of pixels using the SIMD execution unit.

15. The method of claim 14, wherein the processing unit includes multi-threaded issue logic, the method further comprising concurrently processing pixels from multiple groups of pixels in the SIMD execution unit using multiple threads.

16. The method of claim 14, wherein the SIMD execution unit is a first SIMD execution unit, wherein the processing unit includes a second SIMD execution and issue logic configured to issue instructions to the first and second SIMD execution units, the method further comprising concurrently processing pixels from a first group of pixels and a second group of pixels using the first SIMD execution unit and the second SIMD execution unit, respectively.

17. The method of claim 14, wherein the group of pixels includes at least first and second pixels, wherein calculating the plurality of filtering weights for each pixel in the group of pixels includes, in a first scalar operation, concurrently calculating a first filtering weight for each of the first and second pixels and storing the first filtering weights for the first and second pixels in a third vector register in the vector register file, and in a second scalar operation, concurrently calculating a second filtering weight for each of the first and second pixels and storing the second filtering weights for the first and second pixels in a fourth vector register in the vector register file.

18. The method of claim 17, further comprising loading a plurality of color vectors into the vector register file, each color vector associated with a texel for which a filtering weight has been calculated, wherein performing the at least one vector operation for each pixel in the group of pixels includes, for the first pixel, performing a plurality of vector multiplication operations, each operation multiplying a filtering weight calculated for the first pixel with a color vector associated with such filtering weight, and summing results of the plurality of vector multiplication operations to generate a color update vector for the first pixel.

19. The method of claim 18, further comprising storing the color update vector in a frame buffer.

* * * * *